United States Patent
Stählin

(10) Patent No.: US 9,432,068 B2
(45) Date of Patent: Aug. 30, 2016

(54) COMMUNICATION DEVICE FOR A VEHICLE

(71) Applicant: Ulrich Stählin, Eschborn (DE)

(72) Inventor: Ulrich Stählin, Eschborn (DE)

(73) Assignee: Continental Automotive GmbH, Hannover (DE)

(*) Notice: Subject to any disclaimer, the term of this patent is extended or adjusted under 35 U.S.C. 154(b) by 0 days.

(21) Appl. No.: 14/394,035

(22) PCT Filed: Mar. 19, 2013

(86) PCT No.: PCT/EP2013/055599
§ 371 (c)(1),
(2) Date: Oct. 10, 2014

(87) PCT Pub. No.: WO2013/152924
PCT Pub. Date: Oct. 17, 2013

(65) Prior Publication Data
US 2015/0065060 A1 Mar. 5, 2015

(30) Foreign Application Priority Data

Apr. 11, 2012 (DE) .................. 10 2012 205 891

(51) Int. Cl.
*H04B 1/3822* (2015.01)
*H04B 1/38* (2015.01)
(Continued)

(52) U.S. Cl.
CPC ........... *H04B 1/3822* (2013.01); *B60Q 1/0017* (2013.01); *B60Q 1/0023* (2013.01); *B60Q 1/44* (2013.01); *B60Q 1/46* (2013.01); *B60Q 1/52* (2013.01); *B60Q 1/525* (2013.01); *G08G 1/0965* (2013.01); *G08G 1/09623* (2013.01); *G08G 1/096716* (2013.01); *G08G 1/096741* (2013.01); *G08G 1/096791* (2013.01); *G08G 1/162* (2013.01); *H04B 10/11* (2013.01); *B60Q 2300/47* (2013.01)

(58) Field of Classification Search
CPC ...... H04B 1/3822; H04B 10/11; H04B 1/38; B06Q 1/0017; B06Q 1/0023; B06Q 2900/30
See application file for complete search history.

(56) References Cited

U.S. PATENT DOCUMENTS 6,400,835 B1 6/2002 Lemelson et al.
6,553,288 B2 4/2003 Taguchi et al.
(Continued)

FOREIGN PATENT DOCUMENTS

DE 10048010 B4 6/2001
DE 10259185 A1 7/2004
(Continued)

OTHER PUBLICATIONS

Tsuda h et al: "Road Vehicle Lighting Integration", Proceedings of the International Symposium, On Automotive Technology and Automation (ISATA). Florence, May 20-24, 1991; [Proceedings of the International Symposium on Automotive Technology and Automation (ISATA)], Croydon, Automotive Automation, Gb, Bd. Symp. 24, May 20, 1991, Seiten 219-226, xp000308615.

*Primary Examiner* — Andrew Wendell
(74) *Attorney, Agent, or Firm* — Cozen O'Connor

(57) ABSTRACT

A communication device for a vehicle includes: a transmit unit for wireless transmission of vehicle-related data; and a receive unit for receiving vehicle related data. The communication device is configured to be integrated into a lighting unit.

14 Claims, 1 Drawing Sheet

(51) Int. Cl.

| | |
|---|---|
| *B60Q 1/00* | (2006.01) |
| *B60Q 1/44* | (2006.01) |
| *B60Q 1/46* | (2006.01) |
| *B60Q 1/52* | (2006.01) |
| *G08G 1/0962* | (2006.01) |
| *G08G 1/0965* | (2006.01) |
| *G08G 1/0967* | (2006.01) |
| *G08G 1/16* | (2006.01) |
| *H04B 10/11* | (2013.01) |

(56) References Cited

U.S. PATENT DOCUMENTS

| | | | |
|---|---|---|---|
| 7,322,723 B2 | 1/2008 | Griesinger et al. | |
| 7,764,194 B2 | 7/2010 | Osanai | |
| 8,280,583 B2 | 10/2012 | Staehlin et al. | |
| 8,946,989 B2* | 2/2015 | McWithey | 315/82 |
| 2003/0171890 A1 | 9/2003 | Traylor | |
| 2006/0028327 A1* | 2/2006 | Amis | B60D 1/62 340/431 |
| 2008/0040004 A1* | 2/2008 | Breed | B60R 21/0134 701/45 |
| 2008/0122606 A1 | 5/2008 | Bradley | |
| 2008/0246844 A1* | 10/2008 | Chan | F21K 9/13 348/152 |
| 2009/0016073 A1* | 1/2009 | Higgins-Luthman et al. | B60Q 1/085 362/465 |
| 2009/0051506 A1* | 2/2009 | Hicksted | B60Q 1/2611 340/332 |
| 2010/0267379 A1* | 10/2010 | Stahlin | G08G 1/096716 455/426.1 |
| 2011/0007516 A1* | 1/2011 | Tsai | B60Q 1/2607 362/485 |
| 2011/0039592 A1* | 2/2011 | Haddad | H04L 9/0866 455/515 |
| 2011/0095908 A1* | 4/2011 | Nadeem | B60H 3/00 340/905 |
| 2012/0034905 A1* | 2/2012 | Stahlin | G08G 1/205 455/414.1 |
| 2012/0056741 A1* | 3/2012 | Zhu | G08B 21/0492 340/539.12 |

FOREIGN PATENT DOCUMENTS

| | | |
|---|---|---|
| DE | 10 2005 008378 A1 | 8/2006 |
| DE | 102005012984 A1 | 10/2006 |
| DE | 10 2005 055087 A1 | 5/2007 |
| DE | 10 2005 058503 A1 | 6/2007 |
| DE | 10 2006 059064 A1 | 6/2008 |
| DE | 102008007494 A1 | 9/2008 |
| DE | 10 2009 046827 A1 | 5/2011 |
| WO | WO 2009074655 A1 | 6/2009 |

* cited by examiner

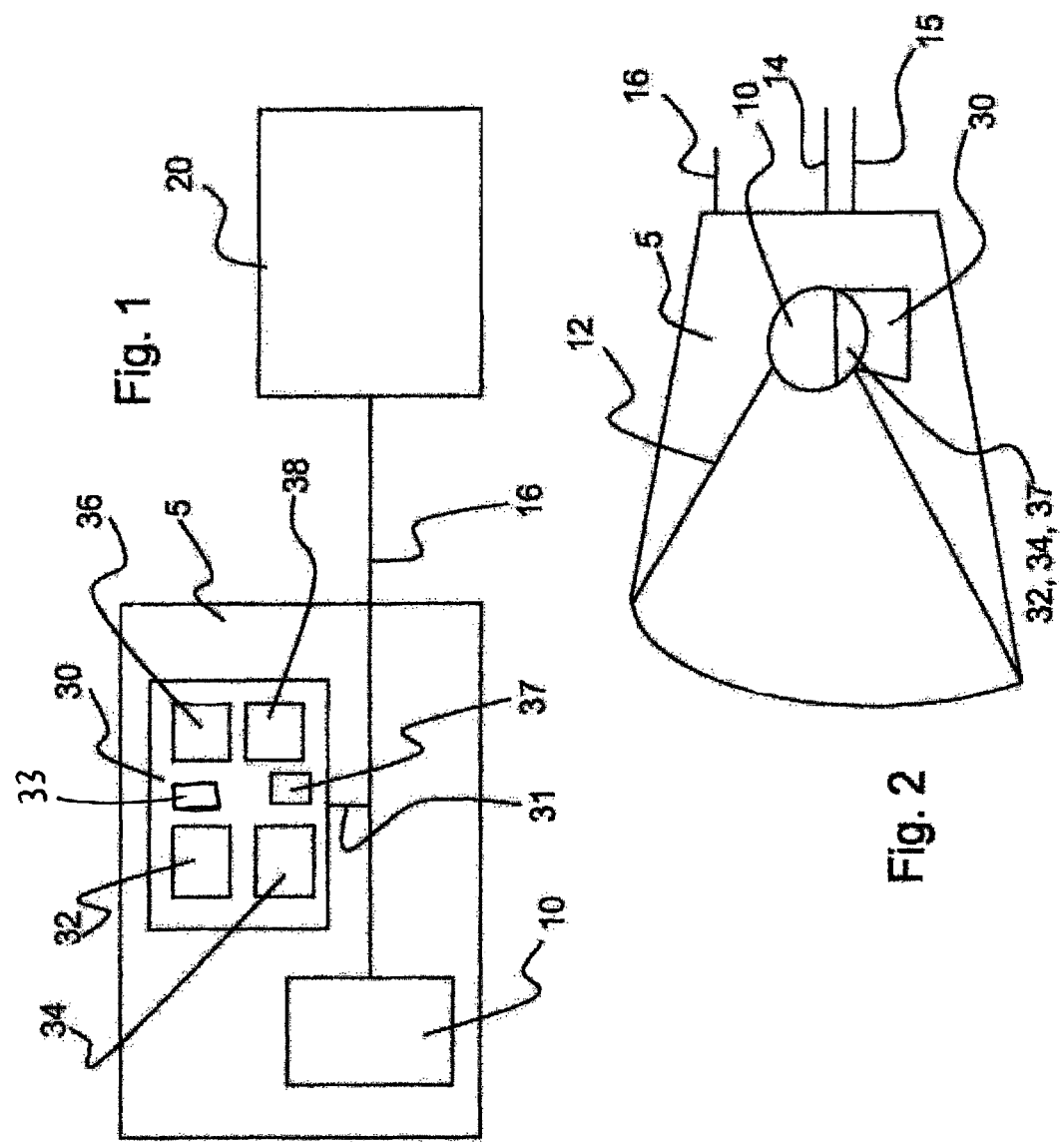

COMMUNICATION DEVICE FOR A VEHICLE

CROSS-REFERENCE TO RELATED APPLICATIONS

This is a U.S. national stage of application No. PCT/EP2013/055599, filed on 19 Mar. 2013, which claims priority to the German Application No. DE 102012205891.5 filed 11 Apr. 2012, the content of both incorporated herein by reference.

BACKGROUND OF THE INVENTION

1. Field of the Invention

The present invention relates to a communication device for a vehicle for wireless transmission of vehicle-related data to another vehicle or an infrastructure as part of wireless vehicle-to-environment communication.

2. Related Art

Vehicle-to-environment communication (C2X or V2X communication) refers to wireless communication that can take place as vehicle-to-infrastructure communication (C2I) or vehicle-to-vehicle communication (C2C). This communication involves the transmission of various information as signals on different radio channels according to the content of this information. Wireless communication based on an intelligent transport system (ITS) communication standard, as specified in IEEE 802.11p, is used in particular for this purpose in Europe and the USA. Other standards exist, however, some of which are also used. Communication in accordance with IEEE 802.11p takes place in Europe, for example, in a frequency band from 5.875 to 5.905 GHz, with implementation of a control channel (CCH) and at least two service channels (SCH). The control channel is used for the broadcast communication in which a piece of information is meant to be transmitted to a plurality or all of the users in the communication network. This channel is reserved for brief, safety-critical information having only short latency times and for communication management. The service channels are used for transmitting additional, non-safety-critical data, for instance application-specific information, road geometry, etc.

One of the basic principles of C2X communication is that information is generated and relayed by numerous users in a network, in particular numerous vehicles. Many applications implemented using C2X communication use this network or involve generating and relaying as much information as possible concerning the safety of continued movement, e.g., relating to traffic jams or other obstacles or relating to the statuses of the vehicles themselves.

Document WO 2009/074655 A1 discloses a communication device for a vehicle that can be used to perform such a communication. Examples of the use of C2X communication are an intersection assistant, drive authorization applications, locating a parked vehicle, pedestrian detection, accident assistant, parking assistant or the like.

It has been assumed until now that vehicles can only be equipped with such a communication device in the factory. If such a communication device is used, especially if it has been designed in accordance with IEEE 802.11p, there could be problems regarding acceptance when such communication devices, or a communication system using such communication devices, are first launched, because the rate at which vehicles are equipped will initially be low. In the launch phase of a C2X communication system it is highly likely that an owner of a vehicle containing a sophisticated C2X communication device only enjoys a few advantages from this device because the number of vehicles equipped with such a communication device is still too low. This problem could hinder or at least delay the launch of the extremely useful system per se.

SUMMARY OF THE INVENTION

An object of the present invention is thus to create a communication device that can serve to reduce the above-mentioned problems in the launch of a C2X system.

The above object is achieved by a communication device designed, according to an aspect of the invention, for integration in a lighting unit.

Such a communication device comprises electronic elements (electronics), preferably a data processing unit and/or a memory unit, and/or comprises a transmit unit for wireless transmission of vehicle-related information, for instance at least one transmit antenna (radiator), and/or comprising a receive unit for wireless reception of vehicle-related information, for instance at least one receive antenna. The data processing unit preferably comprises structure configured to generate vehicle-related information. The units of the communication device are preferably connected to one another.

The above object also may be achieved by a lighting unit for a vehicle, which lighting unit comprises at least one lamp and a communication device for wireless transmission of vehicle-related data to another vehicle or to an infrastructure. Such a lighting unit can constitute a lighting unit for a single light type, for instance a rear fog-light or third brake-light, or also a combined lighting unit for a plurality of light types, for instance headlight or taillight, blinker, brake light and, if applicable, rear fog-light. In addition, the communication device can also be integrated in a special form of a lighting unit, for example in a lighting unit containing a revolving warning light and/or a front speed camera, for instance for emergency vehicles.

The solution according to the exemplary embodiments of the invention has an advantage that the communication device can be fitted not only in new cars at the factory but can also be offered as a retrofit solution. A lighting unit can be retrofitted easily because usually nowadays individual lamps are no longer replaced, but increasingly the entire lighting unit containing a single light type or a light-type combination is replaced. As a retrofit solution, the lighting unit is designed for retrofitting to a vehicle, i.e., it comprises, for example, the necessary attachment structure in order to attach it, preferably detachably, to a position intended for the purpose on the vehicle. Furthermore, the connections to the vehicle power supply and/or a signal input or output are provided at positions on the lighting unit that enable an easy connection to corresponding connections on the vehicle. A replacement module for the original module, which replaces the original module in the event of a fault therein, is also understood to be a retrofit solution.

In addition, the solution according to an aspect of the invention advantageously contains only a limited range of functions compared with a C2X communication device fitted at the factory. The range of functions of the inventive communication device of the vehicle concerned are configured, in particular, such that drivers of other vehicles are better informed, thereby indirectly increasing the safety of the driver of the vehicle concerned. Alternatively, the range of functions provided can be identical to those in the original equipment manufacturer solution.

According to an aspect of the present invention, the communication device is integrated in such a replacement lighting unit and can hence be retrofitted in the vehicle concerned without additional costs of installation in the vehicle. Such a lighting unit also provides the required electrical power for operating the communication device, because this communication device, after fitting in the vehicle, must be connected to the vehicle power supply for powering the lamp. Furthermore, the lighting unit can also be equipped with a signal input and/or a signal output, which can be connected, for example, to the vehicle electronic control unit, in order to receive or transmit control signals for the lighting, for example.

The wired signals inside the vehicle can be transmitted or received via a signal line in the vehicle and/or in the lighting unit, which signal line is connected to the signal inputs and outputs. The signal input and/or the signal output of the lighting unit can be connected to the signal input or, respectively, the signal output of the communication device so that the signals intended for the lighting unit can likewise be used by the communication device, and/or the communication device can relay information to the vehicle electronic control unit via the signal line.

If the lighting unit is provided with a separate electronic control unit or control unit, then the communication device can ideally be combined with that unit.

In the context of the present invention, C2X communication includes communication for example by WLAN (IEEE 802.11a/b/g/n/p), by cellular radio (GSM, GPRS, EDGE, UMTS, LTE), by WiMax, by Bluetooth and the like. In addition, communication can be implemented as part of a remote keyless entry system. The transmit unit and/or receive unit provided in the communication unit in a preferred exemplary embodiment are preferably configured to transmit and/or receive such radio signals, for instance configured as antennas.

The vehicle, for example, may be a motor vehicle such as a car, bus or heavy goods vehicle or alternatively also a rail vehicle, a ship, an aircraft such as a helicopter or airplane, or may be a bicycle.

In an advantageous embodiment, the communication device comprises structure configured to receive and process light signals and/or control signals for the lighting unit, for example a camera or CCD matrix.

Since the lighting unit is not in shadow in the emission direction of the lamp, light signals from other vehicles can be received easily using suitable receiving structure such as a camera or CCD matrix, and then processed by the data processing unit contained in the communication device, the data processing unit advantageously comprising, for this purpose, pattern recognition.

For example, the light warning signal of an emergency vehicle travelling in front of an oncoming emergency vehicle can be detected and processed, preferably using the pattern recognition carried out by the data processing unit. Then the communication device, if the data processing unit has determined from the light-signal pattern that the vehicle is an emergency vehicle, can relay, via its signal output, relevant information, for example to the vehicle electronic control unit, so that the driver is warned of this emergency vehicle, and asked to pull over to the side, for example by a suitable voice output from the loudspeaker or on a display device. In particular, the communication device can determine from which direction the emergency vehicle is coming, so that this information, which is sometimes not so easy for the driver to recognize without further assistance, can also be relayed to the driver ultimately. Similarly, it is also possible to determine, for example, whether vehicles in front are driving with hazard warning lights, enabling prompt recognition of a traffic jam.

As further examples, the communication unit can process the information from GPS and from the receiving structure and/or from the control lines of the lighting unit in combination in such a manner that events are detected by the pattern recognition in conjunction the GPS information and transmitted by the communication unit. Thus, for example, emergency braking can be inferred from a flashing signal for the rear light and can also be detected in the GPS signal as sharp deceleration, and can be transmitted accordingly to the environment. The activation of hazard warning lights can also be inferred from a flashing signal for both blinker sides. Combined with the speed information from GPS, it can then be determined whether there is a traffic jam (the hazard warning lights are activated while the vehicle is moving), whether the driver's own vehicle has come to a stop (the hazard warning lights are activated when the vehicle is stationary), or whether emergency braking is taking place (the hazard warning lights are activated as the driver's own vehicle decelerates very sharply), and then the relevant message can be transmitted. Other events can be detected and transmitted in a similar manner.

In addition, the communication device can pick up control signals that are transmitted via the signal input to the lighting unit, for example from the vehicle electronic control unit, and, for example by the transmit unit, transmit this information additionally via the communication network and the above-mentioned radio channels to the communication devices in the other vehicles or in the infrastructure. The connection of the data processing unit of the communication device to the signal input and/or the signal output of the lighting unit can preferably be used for this purpose. This procedure is particularly useful when the vehicle is an emergency vehicle that is on an emergency journey and thus driving under a signal light, e.g., blue light.

It is also advantageous if the communication device can be connected to at least one lamp in the lighting unit, and that at least one lamp can be actuated by the communication device, in particular by the data processing unit of the communication device, using appropriate control signals. The communication device can thereby use the lighting unit directly to communicate with other vehicles or the infrastructure. If, for example, the communication device and/or another point on the vehicle has detected a traffic jam, the communication device would control the hazard-warning lamp in the lighting unit directly and thereby actuate the hazard warning lights, with the result that drivers behind can also be warned. In addition, if the vehicle has to perform emergency braking and the communication device detects this, a particular light sequence can be performed by the lamps of the lighting device (emergency brake light), which can be used to inform other vehicles about the emergency braking.

In the context of the present invention, lamps are all electrical equipment and electrical loads of the vehicle that are used for generating light. Chemical and/or physical processes are employed in each of these lamps for this purpose. Every lamp constitutes a light source. The lamps include incandescent lamps, gas discharge lamps, light emitting diodes and induction lamps.

It is also advantageous if the communication device comprises a positioning unit, preferably containing a GPS receiver. The communication device can thereby work autonomously and, for instance, provide information about the surrounding terrain, the roads, intersections and the like from the GPS receiver with antenna and from maps provided in the memory unit in the communication device for the purpose of processing the vehicle-related data.

It should be mentioned at this point that, in the context of the present invention, GPS is used as the generic term for all global navigation satellite systems (GNSS) such as, for instance, GPS, Galileo, Glonass (Russia), Compass (China), IRNSS (India) or the like.

According to an aspect of the invention, the present retrofit solution for a communication device can contain, in a suitable memory unit, a certificate or certificates containing information about this retrofit solution and/or the type of the retrofit solution and/or the limitations of the retrofit solution. As has already been explained above, the communication device shall preferably not contain the entire palette of information and safety services that might be contained in a communication device that was fitted as an original equipment in the factory (and which then might have been installed in a different position on the vehicle, if applicable). In contrast, the communication device envisaged in the context of the present application preferably contains only a limited range of functions of the information services and/or safety services of C2X communication that are known per se. It is hence advantageous if the other users of the C2X system, for example the surrounding vehicles or the infrastructure, are informed that the communication device of the retrofit solution comprises the corresponding limited range and are informed about the nature of the limitation of the range of functions. The vehicles and the infrastructure may also be able to identify, from the declaration of the type of retrofit solution, what function limitations are associated with this type.

The lighting unit according to the invention further comprises preferably at least one reflector, wherein the transmit unit and/or the receive unit and/or the structure configured to receive light signals in the communication device is arranged inside the at least one reflector. Inside the reflector, the lighting unit is not in shadow, and therefore signals can easily be transmitted from there to the outside, and/or signals can be received from outside. Signals are then, however, preferably received and/or emitted into the spatial direction defined by the aperture angle of the reflector. 360° emission and/or 360° reception of information is actually not necessarily required in many cases, because the information from the communication device concerns in particular the vehicles in front or behind.

BRIEF DESCRIPTION OF THE DRAWINGS

Further advantages, features and possible uses of the present invention also appear in the following description of exemplary embodiments and in the figures. All the features described and/or depicted therein form individually or in combination the subject matter of the present invention irrespective of how they are combined in the claims or the dependency references thereof. In the drawings:

FIG. 1 shows a lighting unit according to the invention comprising the communication device according to the invention and additional vehicle components; and FIG. 2 shows a cross-section through a lighting unit according, to the invention.

DETAILED DESCRIPTION OF THE PRESENTLY PREFERRED EMBODIMENTS

A lighting unit 5, intended as an retrofit solution for vehicles, comprises lamps 10 and a reflector 12 in which are arranged one or more lamps 10, for instance a xenon gas discharge lamp or an incandescent lamp. Terminals 14, 15 are provided on the lighting unit 5 to supply power and can be used to connect the lighting unit 5 to the live conductor of the vehicle power supply and to the vehicle ground respectively. The lighting unit 5 is shown separately in the FIG. 2, for instance before it is fitted in the vehicle, whereas FIG. 1 shows the situation in which it is fitted in the vehicle.

In addition, a signal line 16 is provided on and inside the lighting unit 5 and is connected to the vehicle electronic control unit 20 and/or (not shown) to at least one control element such as levers, rotary knobs or the like for actuating the lamps 10 arranged in the lighting unit 5. The lighting unit 5 can be controlled by the vehicle driver via the electronic control unit 20. For example the headlights and taillights can be switched on by turning a rotary knob to a specific defined position. The lighting unit 5 then receives from the electronic control unit 20 connected to the rotary knob a signal that causes the at least one lamp 10 arranged in the lighting unit 5 to change from the "off" state into the "on" state. If applicable, the lamp(s) 10 can also be dimmed according to the switch position of the rotary knob.

In the lighting unit 5 additionally has a communication device 30, which is connected to the power supply line 14, 15 and to the signal line 16. The signals transferred via the signal line 16 from the control elements or electronic control unit 20 to the lamps 10 are hence accordingly also provided to the communication device 30 via line 31.

The communication device 30 comprises a transmit unit 32, a receive unit 34, a data processing unit 36 and a memory unit 33. In addition, a positioning unit 38 is provided, for instance in the form of a GPS receiver. The transmit unit 32, the receive unit 34 and the positioning unit 38 are intended for transmitting and/or receiving radio data and comprise an antenna, for instance.

The communication device also contains a light-detection unit 37 such as a CCD matrix or a camera, configured to receive light signals, for example from vehicles in front. The light signals converted into electrical signals by the light-detection unit 37 are then transferred to the data processing unit 36 and processed therein, for example analyzed and investigated by the pattern recognition to establish whether they are vehicle-related light signals. It is hence possible to identify, for example, hazard warning lights of a vehicle lying in the driving direction or an emergency vehicle, for instance an ambulance, on an emergency journey.

The use of the lighting unit and communication device according to exemplary embodiments of the invention is described with reference to the following examples:

EXAMPLE 1

The vehicle initiates emergency braking. The vehicle electronic control unit 20 also notifies the communication device 30 of this occurrence via the signal line 16. The data processing unit 36 of the communication device 30 thereupon causes the at least one lamp 10 to emit a defined, specific light sequence. The data for this purpose is transmitted from the communication device 30 to the lamp(s) 10 via the signal line 16. In addition, if applicable, relevant warning information can be transmitted via the radio channel(s) by the transmit unit 32.

The vehicles in front and behind can therefore recognize very quickly that the vehicle is performing emergency braking and react accordingly. In particular, thanks to the specific light sequence, the drivers of vehicles that are not yet equipped with such a communication device can also recognize visually that the vehicle must perform emergency braking.

EXAMPLE 2

Similar to example 1, the communication device can initiate hazard-warning flashing of the lamps 10 if the vehicle comes to a standstill because of a technical fault. In addition, similar to example 1, relevant warning information including the location of the vehicle, which has been determined by the positioning unit 38, can also be transmitted via the radio channel(s) by the transmit unit 32.

EXAMPLE 3

When there is a traffic jam ahead in the driving direction, the vehicle can recognize this very quickly because the light-detection unit 37 receives hazard-warning-light signals from the vehicles in front and routes these signals to the data processing unit 36. The communication device 30 uses the integral pattern recognition capability to establish that the signals relate to hazard warning lights, with the result that the data processing unit 36 then relays to the driver the traffic-jam hazard, for example by a voice message via the vehicle loudspeaker. Once a traffic jam has been recognized, the communication device 30 can accordingly also control the at least one lamp 10 to emit hazard warning lights and hence inform the vehicles behind about the traffic jam independently of a radio link to these vehicles.

EXAMPLE 4

An emergency vehicle contains the transmit unit 32, the receive unit 34 and/or the light-detection unit 37 of the communication device 30 according to the invention in a lighting unit 5 in the form of a revolving warning light inside the reflector 12 (see FIG. 2). Since the revolving warning light is rotating during the emission of the emergency signal, in this case during the rotation of the reflector through 360°, relevant information can be transmitted and/or received by the communication device 30 also in all directions in the plane of rotation.

EXAMPLE 5

As part of C2X communication according to the ITS standard, the communication device 30 comprising the transmit unit 32 can emit what are known as cooperative awareness messages (CAM) to participating users in the surroundings. These cooperative awareness messages are emitted like a light signal and can be received continuously by the other users, for instance to provide an overview of the communication partners and the basic status of these partners in networks containing constantly changing users of the C2X communication. These CAM messages are emitted according to the standard provided at regular time intervals of at least 100 ms, or 2 Hz to 10 Hz, and in the present communication device having a limited range of functions preferably (but not exclusively) contain data containing fixed values defined for the vehicle concerned, for instance regarding the vehicle type, the dimensions of the vehicle or the like. The transmit unit 32 transmits by radio in the form of such a CAM message information about the mass of the vehicle, for instance, preferably containing a value that is fixed over all time, which information is transmitted periodically, for example in accordance with IEEE 802.11p.

Alternatively, the mass information can be transmitted before a collision with another vehicle.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A communication device (30) for a vehicle, comprising:
   a transmit unit (32) for wireless transmission of vehicle-related data;
   a receive unit (34) for receiving vehicle related data; and
   a memory (33) that stores one or more certificates containing information relating to the existence of a retrofit solution, the type of the retrofit solution and the limitations of the retrofit solution,
   wherein the communication device (30) is configured to be integrated into a lighting unit (5).

2. The communication device (30) as claimed in claim 1, further comprising:
   a light detection unit (37) configured to receive and process light into light signals; and
   a data processing unit (36) configured to receive the light signals and/or control signals for the lighting unit (5).

3. The communication device (30) as claimed in claim 2, wherein the data processing unit (36) is configured to perform pattern recognition.

4. The communication device (30) as claimed in claim 3, wherein the communication device (30) is configured to:
   be connectable to at least one lamp (10) in the lighting unit (5), and
   actuate the at least one lamp (10).

5. The communication device (30) as claimed in claim 4, further comprising a positioning unit (38) configured to determine a position of the vehicle.

6. The communication device (30) as claimed in claim 2, wherein the data processing unit (36) is further configured to generate vehicle-related information to be transmitted by the transmit unit (32).

7. The communication device as claimed in claim 1, wherein the communication device is configured to cooperate with an electronic control unit or control unit of the lighting unit.

8. A lighting unit (5) for a vehicle, comprising at least one lamp (10) and the communication device (30) as claimed in claim 2.

9. The lighting unit (5) as claimed in claim 8, wherein the lighting unit is configured to be retrofittable in a vehicle and comprises an electronic control unit or control unit configured to cooperate with the communication device.

10. The lighting unit (5) as claimed in claim 9, wherein the lighting unit comprises at least one reflector (12), and the transmit unit (32) and/or the receive unit (34) and/or the light detection unit (37) in the communication device (30) is arranged inside the at least one reflector (12).

11. The communication device (30) as claimed in claim 1, wherein the wireless transmission comprises C2X communication.

12. The communication device (30) as claimed in claim 2, wherein the light detection unit (37) comprises a camera or a CCD matrix.

13. The communication device (30) as claimed in claim 5, wherein the positioning unit (38) comprises a GPS receiver.

14. The communication device (30) as claimed in claim 3, wherein the pattern recognition is configured to establish whether light signals from the light detection unit (37) are vehicle-related light signals from another vehicle.

* * * * *